United States Patent
Ahmaniemi

(10) Patent No.: US 9,711,121 B1
(45) Date of Patent: *Jul. 18, 2017

(54) LATENCY ENHANCED NOTE RECOGNITION METHOD IN GAMING

(71) Applicant: Berggram Development Oy, Helsinki (FI)

(72) Inventor: Ali Ahmaniemi, Helsinki (FI)

(73) Assignee: BERGGRAM DEVELOPMENT OY, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,136

(22) Filed: Jun. 29, 2016

Related U.S. Application Data

(63) Continuation-in-part of application No. 14/979,731, filed on Dec. 28, 2015.

(51) Int. Cl.
*G10H 3/12* (2006.01)
*G10H 1/36* (2006.01)
*A63F 13/358* (2014.01)
*A63F 13/814* (2014.01)
*A63F 13/215* (2014.01)

(52) U.S. Cl.
CPC ........... *G10H 1/361* (2013.01); *A63F 13/215* (2014.09); *A63F 13/358* (2014.09); *A63F 13/814* (2014.09); *G10H 3/125* (2013.01); *G10H 2210/066* (2013.01); *G10H 2210/091* (2013.01); *G10H 2220/135* (2013.01)

(58) Field of Classification Search
CPC ..................................................... G10H 3/125
USPC ............................................................ 84/616
See application file for complete search history.

(56) References Cited

U.S. PATENT DOCUMENTS

| 4,479,416 A | * | 10/1984 | Clague | ..................... | G10G 3/04 84/462 |
| 5,038,658 A | * | 8/1991 | Tsuruta | ..................... | G10G 3/04 84/461 |
| 5,773,737 A | * | 6/1998 | Reyburn | ................... | G10G 7/02 84/454 |
| 5,814,748 A | * | 9/1998 | Reyburn | ................... | G10G 7/02 84/454 |

(Continued)

*Primary Examiner* — David Warren
(74) *Attorney, Agent, or Firm* — BelayIP Oy

(57) ABSTRACT

The present invention relates to the field of audio recognition, in particular to computer implemented note recognition methods in a gaming application. Furthermore, the present invention relates to improving latency of such audio recognition methods. One of the embodiments of the invention described herein is a method for note recognition of an audio source. The method includes: dividing an audio input into a plurality of frames, each frame having a pre-determined length, conducting a frequency analysis of at least a set of the plurality of frames, based on the frequency analysis, determining if a frame is a transient frame with a frequency change between the beginning and end of the frame, comparing the frequency analysis of each said transient frame to the frequency analysis of an immediately preceding frame and, based on said comparison, determining at least one probable pitch present at the end of each transient frame, and for each transient frame, outputting pitch data indicative of the probable pitch present at the end of the transient frame.

20 Claims, 2 Drawing Sheets

(56) References Cited

U.S. PATENT DOCUMENTS

| | | | | |
|---|---|---|---|---|
| 5,929,358 A * | 7/1999 | Reyburn | | G10G 7/02 84/454 |
| 7,273,978 B2 * | 9/2007 | Uhle | | G10H 1/40 84/609 |
| 7,598,447 B2 * | 10/2009 | Walker, II | | G10H 1/0008 700/94 |
| 7,619,155 B2 * | 11/2009 | Teo | | G10G 3/04 84/609 |
| 8,008,566 B2 * | 8/2011 | Walker, II | | G10H 1/0008 84/608 |
| 8,093,484 B2 * | 1/2012 | Walker, II | | G10H 1/0008 381/119 |
| 8,489,404 B2 * | 7/2013 | Lin | | G10L 21/04 704/203 |
| 8,535,236 B2 * | 9/2013 | Heinz | | G10H 1/00 381/312 |
| 9,082,416 B2 * | 7/2015 | Krishnan | | G10L 25/90 |
| 2002/0172372 A1 * | 11/2002 | Tagawa | | G06F 17/30017 381/56 |
| 2002/0181711 A1 * | 12/2002 | Logan | | G11B 27/105 381/1 |
| 2004/0122662 A1 * | 6/2004 | Crockett | | G10L 21/04 704/200.1 |
| 2004/0196913 A1 * | 10/2004 | Chakravarthy | | G10L 19/002 375/254 |
| 2005/0234366 A1 * | 10/2005 | Heinz | | G10H 1/00 600/559 |
| 2005/0247185 A1 * | 11/2005 | Uhle | | G10H 1/40 84/616 |
| 2006/0021494 A1 * | 2/2006 | Teo | | G10G 3/04 84/616 |
| 2006/0050898 A1 * | 3/2006 | Yamada | | H04S 1/002 381/104 |
| 2006/0075881 A1 * | 4/2006 | Streitenberger | | G10H 1/0008 84/609 |
| 2006/0095254 A1 * | 5/2006 | Walker | | G10H 1/0008 704/207 |
| 2006/0112811 A1 * | 6/2006 | Padhi | | G10H 7/08 84/616 |
| 2006/0272485 A1 * | 12/2006 | Lengeling | | G10H 1/40 84/611 |
| 2007/0256551 A1 * | 11/2007 | Knapp | | G09B 5/065 84/722 |
| 2008/0115656 A1 * | 5/2008 | Sumita | | G10G 3/04 84/612 |
| 2008/0271592 A1 * | 11/2008 | Beckford | | G10H 1/0008 84/645 |
| 2009/0182556 A1 * | 7/2009 | Reckase | | G10L 25/93 704/208 |
| 2009/0282966 A1 * | 11/2009 | Walker, II | | G10H 1/0008 84/616 |
| 2010/0000395 A1 * | 1/2010 | Walker, II | | G10H 1/0008 84/616 |
| 2010/0042407 A1 * | 2/2010 | Crockett | | G10L 21/04 704/200.1 |
| 2011/0166865 A1 * | 7/2011 | Chakravarthy | | G10L 19/002 704/500 |
| 2011/0246205 A1 * | 10/2011 | Lin | | G10L 21/04 704/500 |
| 2012/0072209 A1 * | 3/2012 | Krishnan | | G10L 25/90 704/207 |
| 2012/0234158 A1 * | 9/2012 | Chan | | G10L 13/0335 84/622 |
| 2012/0294457 A1 * | 11/2012 | Chapman | | G10H 1/0091 381/98 |
| 2013/0010983 A1 * | 1/2013 | Disch | | G10L 21/04 381/97 |
| 2013/0238344 A1 * | 9/2013 | Chakravarthy | | G10L 19/002 704/500 |
| 2013/0255477 A1 * | 10/2013 | Ierymenko | | G10D 3/04 84/723 |
| 2015/0066493 A1 * | 3/2015 | Bayer | | G10L 19/002 704/211 |
| 2015/0279377 A1 * | 10/2015 | Disch | | G10L 19/025 381/22 |
| 2016/0210947 A1 * | 7/2016 | Rutledge | | G10G 1/04 |
| 2016/0210951 A1 * | 7/2016 | Rutledge | | G10H 1/38 |

* cited by examiner

LATENCY ENHANCED NOTE RECOGNITION METHOD IN GAMING

FIELD OF INVENTION

The present invention relates to the field of audio recognition, in particular to computer implemented note recognition methods. Furthermore, the present invention relates to improving latency of such audio recognition methods. Still yet, aspects relate to applications within gaming.

BACKGROUND OF INVENTION

Audio recognition software has been around for many years. However, most audio recognition software, particularly used for recognizing music and in particular notes, is used on recorded audio files. Since the audio sources are not live, it is possible for old audio recognition software to determine notes through an iterative and time consuming/processor consuming process in order to make accurate determinations.

Current technology requires an audio recognition method for determining notes in an audio file in real time. For old audio recognition software which is not designed for real-time use several problems present themselves, particularly regarding latency. For example, known audio recognition software has trouble in determining what a new note is in a sequence of notes instantaneously. Therefore, some software delay in outputting what the new note is until it is accurately determined.

However, the human ear and brain are quite sensitive and can very quickly determine that a new note is present almost instantaneously, though they may not know exactly what that new note is at the same instance. When someone knows that a new note is present and recognition software they are using does not at the same time register a change, the discrepancy can be easily noticed and cause discomfort for a user.

SUMMARY OF THE INVENTION

One of the embodiments of the invention described herein is a method for note recognition of an audio source. The method comprises the steps of: dividing an audio input into a plurality of frames, each frame having a pre-determined length, conducting a frequency analysis of at least a set of the plurality of frames, based on the frequency analysis, determining if a frame is a transient frame with a frequency change between the beginning and end of the frame, comparing the frequency analysis of each said transient frame to the frequency analysis of an immediately preceding frame and, based on said comparison, determining at least one probable pitch present at the end of each transient frame, and for each transient frame, outputting pitch data indicative of the probable pitch present at the end of the transient frame.

Several of the embodiments described herein can be carried out in real time. An advantage to methods described herein is for latency reduction in, for example, real time note recognition in a computing device. By making a best guess of a note in each of a plurality of frames and outputting that best guess, for example regardless of the confidence in the guess, perceived latency can be noticeably increased. For example, instead of waiting to output a pitch present in an analyzed frame of an audio source until there is high confidence in the correctness of the detected pitch and instead outputting a best guess immediately, a user can correctly perceive the change in pitch with decreased lag in the analysis.

DETAILED DESCRIPTION OF EXEMPLARY EMBODIMENTS

Figure 1:
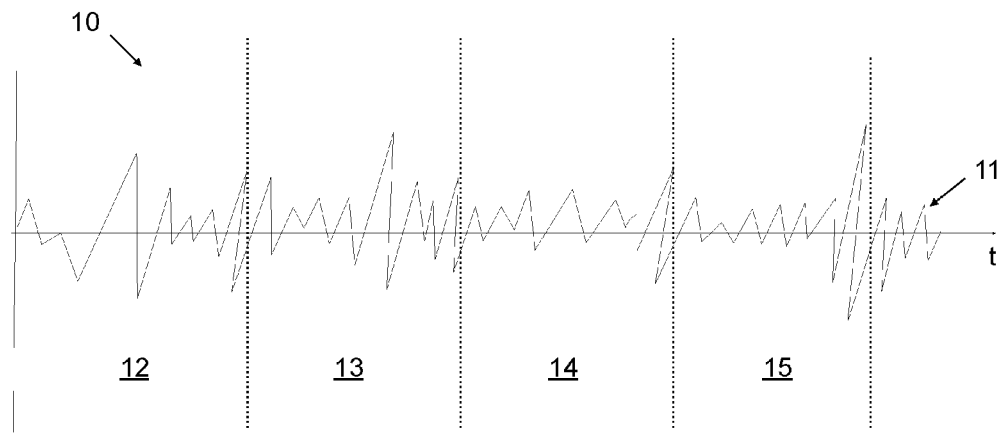
FIG. 1 shows an example time domain signal plot of an audio input.

FIG. 1 shows an example plot 10 of an audio input 11. In the example, the input has been broken into four frames, 12-15.

A frame is simply a finite portion of an audio input. It is preferred that each frame in a method has the same length. For example, if an audio input is from a digital-audio converter having e.g. 44100 samples per second, a frame length can be a predetermined number of said samples, e.g. 512 samples. According to certain examples a frame is between 5-20 milliseconds, preferably 10-15 milliseconds in length. According to certain examples, the length of a frame is 12 milliseconds.

For the purposes of the present description, a frame of an audio input which has additional frequency components compared to the previous frame, such as frames 13 and 16, is considered a transient frame. Additionally, as will be discussed below, other types of frames can be treated as transient frames, even if they do not contain more than one main frequency.

Figure 3:
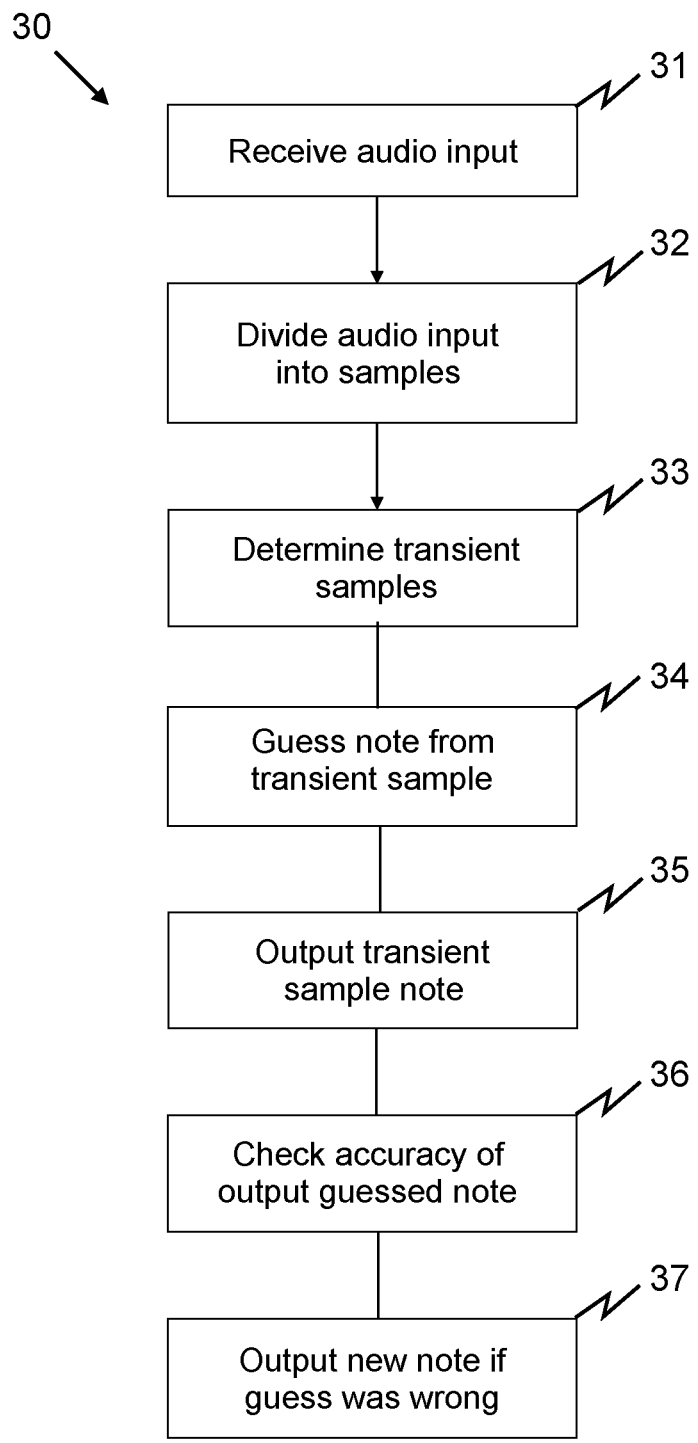
FIG. 3 shows an example method for note recognition.

FIG. 3 shows an example method of note recognition 30. First an audio input is received 31. The audio input can be in many forms. For example, the audio input can be a recording and can be in the form of an audio file stored on a computer readable medium. Additionally, the audio input can be a live and/or streaming audio input from an audio source. Examples of audio sources can be a streaming internet page, microphone or other input from a stringed instrument, or an electric keyboard. The audio input can also be a signal from a digital-audio converter.

The audio input is then divided 32 into a series of frames, for example as shown in FIG. 1. For example, if the audio input is pre-stored then it can be broken into a plurality of even frames. For real-time processing, a predetermined frame length can be set and as enough of the audio input is received to form the next frame in a series of frames, then the frame is formed and the system can analyses it. Additionally, there can be buffering between the reception of the audio input, the dividing into frames and the processing of the frames as discussed below.

According to certain examples, for each frame it is determined what pitch is present during the frame. This can be done in a plurality of ways. For example, the frequency during the frame can be averaged and/or subjected to one or more filters which determine the pitch present during that frame. Additionally, a frequency graph from the frame can be created and analyses to determine a pitch present during the frame. Still yet, the frame, or a frequency graph for the frame, can be compared to pre-stored examples/charts to determine based on correlation what the pitch present is during the frame. Likewise, combinations of the above are possible.

Additionally, a pitch determined herein can be a perceived pitch of a listener to the audio input. The pitch, or perceived pitch, of a frame typically includes a set of frequencies. For example, if an A-note is recorded from a guitar and used as an audio input, a frequency analysis of a frame while the A-note is being played can contain several frequency components such as 110 Hz, 220 Hz, 440 Hz, 660 Hz and 880 Hz. Of these components, 110 Hz can be considered the fundamental frequency which corresponds to the perceived pitch of A. Therefore, a frequency analysis of a frame can include a determination of one or more fundamental frequencies, which correspond to one or more pitches present in the frame. Based on this frequency analysis, pitch data which is indicative of the pitch or pitches in the frame can be generated and output.

Furthermore, in examples where a pitch is determined for each frame, the determined pitch for one frame can be compared to the determined pitches of the preceding pitches to determine a consistent pitch being present over a plurality of frames.

However, it is transient frames which present the most problems. Therefore, according to certain examples, it is determined for each frame if the frame is transient or not 33. Such a determination can occur in several ways. For example, if a new frame is compared to an earlier frame, e.g. the immediately preceding frame, and the two frames are the same or similar, then it can be determined that the new frame is not a transient frame.

Additionally, the frequency graph/frequency analysis of a new frame can be compared to the frequency graph/frequency analysis of an earlier frame. In particular high frequency peaks between the two frames can be compared. If the high frequency peaks in two frames occurs in approximately the same range(s) then it can be determined that the pitches present in both frames are the same and that the new frame is not a transient frame. However, if high frequency peaks in the new frame differ from those of the previous one by more than a predetermined amount, then it can be determined that the new frame is a transient frame. Therefore it is likely the pitch present at the end of the transient frame is a different pitch than at the beginning of the transient frame.

As described herein as well, silence, or the lack of at least one defined perceived pitch, for example, can be considered a pitch. Particularly, when determining transient frames, a frame which has no note, pitch, perceived pitch and/or has silence at only one end of the frame, or only during a middle portion of the frame, can be considered transient.

As described herein, a note can be an specific pitch, e.g. a specific frequency, or it can be a base note, e.g. C, D, E, F, G, A, B, C which is independent of an octave. For example, the note can also be one of a sup-set of all notes or a general note which is representative of a group of notes, as discussed above. A further example is where an audio source is a stringed instrument, e.g. a midi guitar, regular guitar or electric violin, and the note is representative of one of the frets, e.g. one of the nine frets of a standard guitar, and/or one of the five strings.

Additionally, the note can be any of the notes as described in U.S. Pat. No. 8,802,955 "Chord based method of assigning musical pitches to keys", WO/2015/055895 "Selective pitch emulator for electrical stringed instruments" or WO 2015/140412 "Method for adjusting the complexity of a chord in an electronic device", all three of which publications are incorporated by reference in their entirety herein. Furthermore, the notes as described herein can be input to any of the methods and systems as described in the publications incorporated by reference in the present description.

Figures 2A, 2B, 2C:
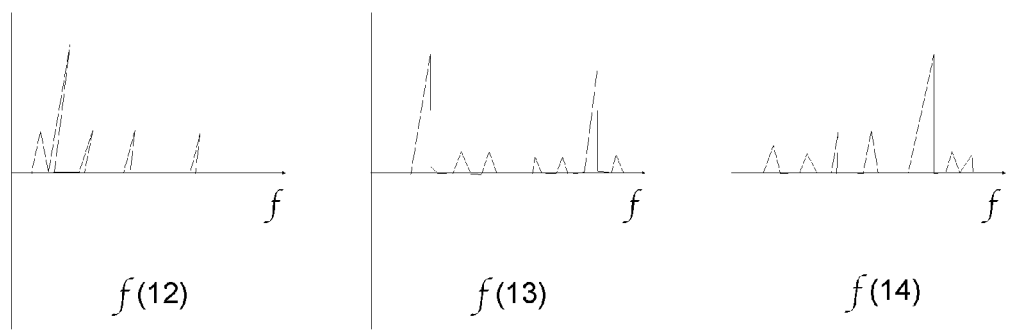
FIGS. 2A-2C show frequency graphs of samples 12-14 respectively from the plot of FIG. 1.

Once a transient frame has been determined, the probable pitch at the end of the transient frame is guessed 34 and output 35. FIGS. 2A-2C show frequency charts of the frames 12-14 including that of transient frame 13 and the immediately preceding frame 12 and following frame 14. As can be seen in the figure, frame 12 has an detected pitch f(12) which is indicative of a first pitch. Similarly, frame 14 has an detected pitch f(14) which is indicative of a second pitch. However, the detected pitch of frame 13 would not be an accurate representation of the pitch played at either the beginning nor the end of the frame as it is a combination of two pitches.

In the middle of frame 13 a new pitch is played which is fully registered by frame 14 but also for a portion of frame 13. In the current example, a detected pitch of frame 13 would be lower than what would be indicative of the actual pitch being present at the end of the frame due to the presence for a portion of the time of f(12) which is lower than f(14). Therefore, when a transient frame has been detected, the system can make it's best guess as to what the new pitch is and output that best guess.

The system can determine the best guess in several ways. According to one example, the detected pitch of the transient frame can be compared to that of the detected pitch of the previous frame. If the detected pitch of the previous frame was lower than the detected pitch of the transient frame then an assumption can be made that the detected pitch of the transient frame is lower than the detected pitch indicative of the new pitch being played. Therefore, if the detected pitch of the transient frame is between a base pitch C and a base pitch D, the guess can be made that it is more likely D than C and the base pitch D can be output.

Similarly, if a frequency chart is compared between the transient frame and the previous frame then the changes in high frequency peaks can be determined and a similar analysis made as discussed above. However, it is useful that a guess is made which is a different from the previous frame pitch. This is so that a user who self-identifies a change in pitch will also concurrently realize a change in pitch from the pitch recognition software and thereby reduce latency. The fact that the guess may be wrong is generally less important than the fact that a change has been made in the first place.

Once a guess has been made and output and the following frame 14 is received, then a more accurate pitch determination can be made on the non-transient frame 14. The accuracy of the guess made in step 34 can be checked in step 36 by comparing it to the pitch determined for the following frame 14. If the pitch determined for the following frame is the same as the guess then it can be determined that the guess was accurate and nothing needs to be changed. If the guess is determined to be wrong, then a new pitch can be output 37 in accordance with the determination of the new pitch in the following, non-transient frame, e.g. 14.

In most scenarios, if the guess is slightly wrong then it is only wrong for about one frame length. While one frame length is long enough for a user to determine that something has changed, it is typically not long enough for a user to determine what the exact pitch is, nor that a "wrong" pitch was output for a single, or even a few, frame length(s).

According to a certain example, there is a method for note and/or pitch recognition of an audio source including dividing an audio input into a plurality of frames, determining if a frame is a transient frame and conducting a frequency analysis of each transient frame. Additionally, a frequency analysis of each frame immediately preceding each transient frame can be made and to determine a probable pitch present at the end of each transient frame.

The methods described herein can be carried out in real time. For example, the time from the input of a frame to the output of the probable pitch can be less than or equal to one frame. For example, if a frame is 512 samples, and there are 44100 samples per second in the audio input, then the length of the frame can also be expressed as between 11-12 milliseconds, e.g. 11.6 milliseconds.

Methods can further include conducting a frequency analysis of at least one non-transient frame following a transient frame, checking if the pitch of said following frame is the same as the output probable pitch and if not, outputting the pitch of the following frame.

Additionally, for each frame, a probability can be determined that the determined pitch is accurate. If the probability is below a pre-determined threshold, then the frame can be considered to be a transient frame.

According to certain examples, there is a method for note recognition of an audio source, comprising the step conducting a frequency analysis of at least a set of a plurality of frames. The set can be all of the frames of an audio input or a subsection. Based on the frequency analysis, determining if a frame is a transient frame can be carried out. The determination can be based on if there is a frequency change between the beginning and end of the frame, or a likelihood thereof.

The frequency analysis of each transient frame can be compared to the frequency analysis of at least one immediately preceding frame and. Based on said comparison, it can be determined at least one probable pitch present at the end of each transient frame.

For one or more frame, and/or for each or at least one transient frame, outputting pitch data indicative of the probable pitch present at the end of the frame.

The frequency analysis of each frame can includes determining an estimated pitch determination for the frame and a probability that the determined pitch is correct. Pitch data indicative of the probably pitch can be based on a determined fundamental frequency component of the frequency analysis for each frame which correlates to a specific perceived pitch or set of perceived pitches, e.g. a chord or an un-correlated set of pitches.

Determined pitch data can includes at least one of the following notes; C, C#, D, D#, E, F, F#, G, G#, A, A#, and B with or without an octave indicator. For example, pitch data can be one of the 88 distinct pitches of a standard electric keyboard.

Examples as described above are particularly useful for a system when information regarding the intended next pitch to be played is unknown. When a transient frame is detected, the best guess of the new pitch can be made and subsequently altered or updated when the actual played pitch is determined. However, there are certain applications, such as within gaming, where the intended next pitch to be played is known, even if the actual next pitch to be played still needs to be determined as outlined above.

In a gaming application, a user can be presented with one or more notes/pitches which are to be played within the game. As such, the system running the gaming application is informed of the next note/pitch to be played. Applying the concepts outlined above, when a note change or transient frame is detected, in order to reduce latency, the new pitch can be played in accordance with the known next intended note to be played, instead of the guessed pitch as outlined above. If the user plays a pitch which is different from the intended or instructed note, then the actual played pitch can be updated in accordance with the detected played pitch.

Similar to the examples discussed earlier, a user can perceive latency based on the absence of a note change more easily than on the difference between the pitch of a played note. In the first set of examples, this is addressed by making a guess of the note and outputting the best guess from a transient frame. According to the gaming examples though the guessing step is not necessary, though it can still be present, as there is already pitch data available to the system for the transient period.

In a gaming application, a transient frame and/or pitch change can be determined in the same manner as outlined in the earlier examples. Other means for determining a transient frame and/or pitch change can also be used. For example, when a user is playing a game with an instrument, either a real instrument or a virtual instrument which is a part of the game, which is connected to the gaming platform, e.g. a phone, computing device, game console, the instrument may be able to send information which indicates that a user has made a change in the note to be played. The present methods can use this information, or similar information, in place of determining a transient frame. Once a system has been informed of the change then the system can either make a best guess of the played pitch or the system can output the next intended pitch to be played. Following this the system can evaluate the actual pitch played and update the output actual pitch in accordance with the disclosure above.

All of the embodiments and examples described herein are well suited for use in applications bridging the digital and acoustic worlds. A user can play an acoustic instrument, e.g. a guitar, piano, brass instrument, violin, stringed instrument, etc., which is not necessarily directly attached to a computing device or other electronic device. The user can then run an application and/or game on a computing device, e.g. a smart phone, game console, computer, which has incorporated with, or attached to, a microphone. The computing device can use the methods of note recognition and latency reduction discussed herein to use audio input from a connected microphone to use audio played by a user playing the acoustic instrument to be used in an application on the computing device.

For example, a smart phone can run a game which instructs a user to play a sequence of notes with a certain rhythm, e.g. the game can show sheet music with a cursor indicating when a user is supposed to play a certain note. The user, watching a display of the smart phone, can play along with an acoustic guitar which is not physically connected to the smart phone. The game can use the microphone of the smart phone to obtain the audio played from the acoustic guitar and then can synchronize the audio to the notes to be played on the display. When a note change and/or transient frame is detected in the audio input the game can the immediately display to the user information that the user has changed notes to the next note to be played either at the correct time, early or late. After this the game can determine the actual new pitch which is played and indicate to the user if the user has played the correct note or if the user played an incorrect note. Because audio recognition and frequency analysis takes some time after a transition to accurately determine a new pitch, this method reduces the latency for the user so that the user can get more timely information that they change notes at the correct time and subsequently learn if they need to adjust the new pitch that they are playing.

The example above while described with certain specifics can also be applied to non-gaming applications and to a variety of other computing devices, applications and instrument combinations.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for note recognition of an audio source in an application having a set of pitches to be played by a user, said method comprising the steps of:
    dividing an audio input into a plurality of frames, each frame having a pre-determined length,
    conducting a frequency analysis of at least a set of the plurality of frames,
    based on the frequency analysis, determining if a frame is a transient frame with a frequency change between the beginning and end of the frame,
    for each transient frame, outputting pitch data of a pitch to be played by a user at the time of the transient frame,
    conducting frequency analysis of at least one non-transient frame following the transient frame, based on the frequency analysis determining a pitch of the frame,
    checking if the determined pitch of said following frame is the same as the output pitch to be played and if not, outputting the determined pitch data for the following frame.

2. The method according to claim 1, wherein the method is carried out in real time.

3. The method according to claim 2, wherein the time from the input of said frame to the output of the probable pitch is less than one frame.

4. The method according to claim 1, wherein the application is a gaming application.

5. The method according to claim 1, wherein the frequency analysis of each frame includes determining an estimated pitch determination for the frame and a probability that the determined pitch is correct.

6. The method according to claim 5, further comprising, if the probability is below a pre-determined threshold, considering the frame to be a transient frame.

7. The method according to claim 1, wherein the pitch to be played by the user is presented to the user to be played at the time of the determined transient frame.

8. The method according to claim 1, wherein each determined pitch data includes at least one of the following notes; C, C#, D, D#, E, F, F#, G, G#, A, A#, and B with or without an octave indicator.

9. The method according to claim 1, wherein the length of each frame is 5-20 milliseconds.

10. The method according to claim 1, wherein the audio input is from a microphone of an electronic computing device which is running said application.

11. The method according to claim 10, wherein the audio input is of a stringed instrument.

12. A method for note recognition of an audio source in an application having a set of pitches to be played by a user, said method comprising the steps of;
    obtaining an audio input, having a plurality of sequential played pitches, from a microphone of a computing device,
    synchronizing the obtained audio input with the set of pitches to be played,
    determining when a current pitch in the audio input changes to a next pitch,
    outputting data indicative of the pitch to be played at the time a pitch is determined to have changed,
    determining the next pitch which was played, and
    updating the output data to the determined next pitch if the next pitch which was played is different from the output data indicative of the pitch to be played.

13. The method according to claim 12, wherein the audio source is audio played by an acoustic instrument.

14. A non-transitory computer readable medium having stored thereon a set of computer readable instructions for causing a processor of a computing device to carry out a method for note recognition of an audio source in an application having a set of pitches to be played by a user, said method comprising the steps of:

dividing an audio input into a plurality of frames, each frame having a pre-determined length, conducting a frequency analysis of at least a set of the plurality of frames, based on the frequency analysis, determining if a frame is a transient frame with a frequency change between the beginning and end of the frame, for each transient frame, outputting pitch data of a pitch to be played by a user at the time of the transient frame, conducting frequency analysis of at least one non-transient frame following the transient frame, based on the frequency analysis determining a pitch of the frame, checking if the determined pitch of said following frame is the same as the output pitch to be played and if not, outputting the determined pitch data for the following frame.

15. The method according to claim 14, wherein the method is carried out in real time.

16. The method according to claim 15, wherein the time from the input of said frame to the output of the probable pitch is less than one frame.

17. The method according to claim 14, wherein the application is a gaming application.

18. The method according to claim 14, wherein the frequency analysis of each frame includes determining an estimated pitch determination for the frame and a probability that the determined pitch is correct.

19. The method according to claim 14, wherein the pitch to be played by the user is presented to the user to be played at the time of the determined transient frame.

20. The method according to claim 14, wherein the length of each frame is 5-20 milliseconds.

* * * * *